United States Patent
Wilson et al.

(10) Patent No.: US 11,919,339 B2
(45) Date of Patent: Mar. 5, 2024

(54) SHEAR BAND HAVING ULTRA-LOW HYSTERESIS RUBBER

(71) Applicant: Compagnie Generale des Etablissements Michelin, Clermont-Ferrand (FR)

(72) Inventors: Clifford Wilson, Simpsonville, SC (US); Clayton Bohn, Jr., Mauldin, SC (US); Timothy Brett Rhyne, Greenville, SC (US); Steven M Cron, Simpsonville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 1256 days.

(21) Appl. No.: 16/464,586

(22) PCT Filed: Nov. 28, 2017

(86) PCT No.: PCT/US2017/063463
§ 371 (c)(1),
(2) Date: May 28, 2019

(87) PCT Pub. No.: WO2018/102303
PCT Pub. Date: Jun. 7, 2018

(65) Prior Publication Data
US 2021/0094353 A1    Apr. 1, 2021

Related U.S. Application Data

(63) Continuation of application No. PCT/US2016/064252, filed on Nov. 30, 2016.

(51) Int. Cl.
*B60C 7/14* (2006.01)
*B29D 30/02* (2006.01)
(Continued)

(52) U.S. Cl.
CPC ............... *B60C 7/14* (2013.01); *B29D 30/02* (2013.01); *B60C 1/0016* (2013.01);
(Continued)

(58) Field of Classification Search
CPC ....... B60C 7/14; B60C 1/0016; B60C 1/0041; B60C 7/102; B60C 7/18; B60C 7/22;
(Continued)

(56) References Cited

U.S. PATENT DOCUMENTS 6,506,829 B1    1/2003  Materne et al.
2004/0144464 A1    7/2004  Rhyne
(Continued)

FOREIGN PATENT DOCUMENTS

WO    WO-2013095499 A1 *   6/2013   ............... B60C 7/00

OTHER PUBLICATIONS

International Search Report and Written Opinion dated Feb. 2, 2018.

*Primary Examiner* — Angela C Scott
(74) *Attorney, Agent, or Firm* — John Steckler Schwab

(57) ABSTRACT

A shear band that may be used e.g., in a non-pneumatic tire is provided. The shear band uses interlaced reinforcing elements positioned within a shear layer of elastomeric material. A variety of configurations may be used to create the interlaced positioning of the reinforcing elements including e.g., a horizontal diamond or vertical diamond configuration. The shear layer formed from a rubber composition having a very low hysteresis.

19 Claims, 6 Drawing Sheets

(51) Int. Cl.
   *B60C 1/00*    (2006.01)
   *B60C 7/10*    (2006.01)
   *B60C 7/18*    (2006.01)
   *B60C 7/22*    (2006.01)
   *C08J 5/04*    (2006.01)
   *C08K 3/04*    (2006.01)
   *C08K 3/36*    (2006.01)
   *C08K 7/14*    (2006.01)
   *C08L 7/00*    (2006.01)
   *C08L 9/06*    (2006.01)

(52) U.S. Cl.
   CPC ............ *B60C 1/0041* (2013.01); *B60C 7/102* (2013.01); *B60C 7/18* (2013.01); *B60C 7/22* (2013.01); *C08J 5/041* (2013.01); *C08J 5/043* (2013.01); *C08J 5/046* (2013.01); *C08K 3/04* (2013.01); *C08K 3/36* (2013.01); *C08K 7/14* (2013.01); *C08L 7/00* (2013.01); *C08L 9/06* (2013.01); *B60C 2001/0091* (2013.01); *B60C 7/146* (2021.08); *C08J 2467/02* (2013.01); *C08J 2477/00* (2013.01); *C08K 2201/006* (2013.01); *C08L 2312/00* (2013.01)

(58) Field of Classification Search
   CPC . B60C 7/146; B60C 2001/0091; B29D 30/02; C08J 5/041; C08J 5/043; C08J 5/046; C08J 2467/02; C08J 2477/00; C08K 3/04; C08K 3/36; C08K 7/14; C08K 2201/006; C08L 7/00; C08L 9/06; C08L 2312/00
   See application file for complete search history.

(56) References Cited

U.S. PATENT DOCUMENTS

| | | |
|---|---|---|
| 2004/0187996 A1 | 9/2004 | Gran |
| 2011/0152434 A1 | 6/2011 | Schweitzer et al. |
| 2012/0283354 A1 | 11/2012 | Hattori et al. |
| 2014/0326374 A1 | 11/2014 | Cron et al. |

* cited by examiner

SHEAR BAND HAVING ULTRA-LOW HYSTERESIS RUBBER

BACKGROUND OF THE INVENTION

Field of the Invention

This invention relates generally to a reinforced shear band useful for non-pneumatic tires and more specifically to the rubber composition forming the shear band.

Description of the Related Art

The details and benefits of non-pneumatic tire constructions are described e.g., in U.S. Pat. Nos. 6,769,465; 6,994,134; 7,013,939; and 7,201,194. Certain non-pneumatic tire constructions propose incorporating a shear band, embodiments of which are described in e.g., U.S. Pat. Nos. 6,769,465 and 7,201,194, which are incorporated herein by reference. Such non-pneumatic tires provide advantages in tire performance without relying upon a gas inflation pressure for support of the loads applied to the tire.

By way of background, FIG. 1 provides a cross-sectional view of an exemplary embodiment of a non-pneumatic tire 100 incorporating a shear band 110. Tire 100 also includes a plurality of tension transmitting elements, illustrated as web spokes 150, extending transversely across and inward from shear band 110. A mounting band 160 is disposed at the radially inner end of the web spokes. The mounting band 160 anchors the tire 100 to a hub 10. A tread portion 105 is formed at the outer periphery of the shear band 110 and may include e.g., grooves or ribs thereon.

The shear band 110 of tire 100 includes a shear layer as well as an innermost reinforcement layer adhered to the radially innermost extent of the shear layer and an outermost reinforcement layer adhered to the radially outermost extent of the shear layer. The reinforcement layers have a tensile stiffness that is greater than the shear stiffness of the shear layer so that the shear band undergoes shear deformation under vertical load. More specifically, as set forth in U.S. Pat. No. 7,201,194, when the ratio of the elastic modulus of the reinforcement layer to the shear modulus of the shear layer ($E'_{membrane}/G$), as expressed in U.S. Pat. No. 7,201,194, is relatively low, deformation of shear band 110 under load approximates that of a homogenous band and produces a non-uniform ground contact pressure. Alternatively, when this ratio is sufficiently high, deformation of the shear band 110 under load is essentially by shear deformation of the shear layer with little longitudinal extension or compression of the reinforcement layers. As indicated in FIG. 1, a load L placed on the tire axis of rotation X is transmitted by tension in the web spokes 150 to the annular band 110. The annular shear band 110 acts in a manner similar to an arch and provides circumferential compression stiffness and a longitudinal bending stiffness in the tire equatorial plane sufficiently high to act as a load-supporting member. Under load, shear band 110 deforms in contact area CA with the ground surface through a mechanism including shear deformation of the shear band 110. The ability to deform with shear provides a compliant ground contact area CA that acts similar to that of a pneumatic tire, with similar advantageous results.

In addition to the embodiments shown in U.S. Pat. No. 7,201,194, there are several non-pneumatic tire constructions that can incorporate a shear band. For example, U.S. Pat. No. 6,769,465 relates to a structurally supported resilient tire that supports a load without internal air pressure. In an exemplary embodiment, this non-pneumatic tire includes a ground contacting portion and side wall portions that extend radially inward from the tread portion and anchor in bead portions that are adapted to remain secure to a wheel during rolling of the tire. A reinforced annular band is disposed radially inward of the tread portion. This shear band includes at least one homogenous shear layer, a first membrane adhered to the radially inward extent of the shear layer and a second membrane adhered to the radially outward extent of the shear layer. Each of the membranes has a longitudinal tensile modulus sufficiently greater than the dynamic shear modulus of the shear layer so that, when under load, the ground contacting portion of the tire deforms to a flat contact region through shear strain in the shear layer while maintaining constant length of the membranes. Relative displacement of the membranes occurs substantially by shear strain in the shear layer. The invention of U.S. Pat. No. 6,769,465 provides several advantages including, for example, the ability to operate without an inflation pressure and the flexibility to adjust the vertical stiffness of the tire somewhat independently of the ground contact pressure.

With both pneumatic and non-pneumatic tires, it is desirable to improve the fuel efficiency of the tire. Such an improvement can be achieved by e.g., reductions in the overall size or mass of the tire and/or using lower loss materials in the tire. For non-pneumatic tires employing a shear band having a homogenous shear layer, challenges are encountered in making such reductions. For example, the use of materials for the shear layer that have low energy dissipation can lead to an unacceptable, offsetting increase in the mass of the material required due to typically lower shear modulus of these materials.

An example of such an improvement is the invention disclosed in international application PCT/U.S. Pat. No. 1,166,793 filed on Dec. 22, 2011 that disclosed a shear band having discrete reinforcement elements positioned throughout the annular shear layer.

Accordingly, a shear band that can provide improvement in fuel efficiency by e.g., lowering mass and/or rolling resistance and/or improvements to the materials that form the shear band would be beneficial. Such a shear band that can be incorporated into a variety of non-pneumatic tire constructions would be particularly useful.

SUMMARY OF THE INVENTION

Particular embodiments of the present invention include an annular shear band and articles having the annular shear band, including non-pneumatic tires. Such annular shear bands may include an annular shear layer constructed from a rubber composition and a plurality of discrete, annular reinforcing elements positioned along a plurality of axially-oriented rows throughout the annular shear layer. The reinforcing elements may be separated from one another by a predetermined distance, each reinforcing element having a centerpoint, wherein the reinforcing elements are interlaced along the axial or radial direction of the shear band such that the center points of reinforcing elements of adjacent, axially-oriented rows are arranged to form a rhombus having non-orthogonal angles between sides of the rhombus.

The rubber composition of the annular shear layer is based upon a cross-linkable rubber composition, the cross-linkable rubber composition comprising, in parts by weight per 100 parts by weight of rubber (phr) between 50 phr and 100 phr of a natural rubber and between 0 phr and 50 phr of a second rubber component. The second rubber component may be selected from the group consisting of polybutadiene rubber, a copolymer of polybutadiene and styrene wherein the copolymer has no more than 5 mol % styrene and combinations thereof.

Such rubber compositions may further include between 15 phr and 40 phr of a reinforcing filler that comprises at least 5 phr but no more than 35 phr of a total amount of a carbon black, the total amount of the carbon black limited to a first portion having a target surface area of between 25 m²/g and 39 m²/g and between 0 phr and 5 phr of a second portion having its surface area of other than between 25 m²/g and 39 m²/g. A sulfur cure system is also included.

The rubber compositions disclosed herein may include having a physical characteristic of low hysteresis. Therefore particular embodiments of the rubber compositions disclosed herein have a tan delta measured at 23° C. and at 80% strain of between 0.013 and 0.025.

The foregoing and other objects, features and advantages of the invention will be apparent from the following more detailed descriptions of particular embodiments of the invention, as illustrated in the accompanying drawing wherein like reference numbers represent like parts of the invention.

DETAILED DESCRIPTION OF PARTICULAR EMBODIMENTS

Figure 1:
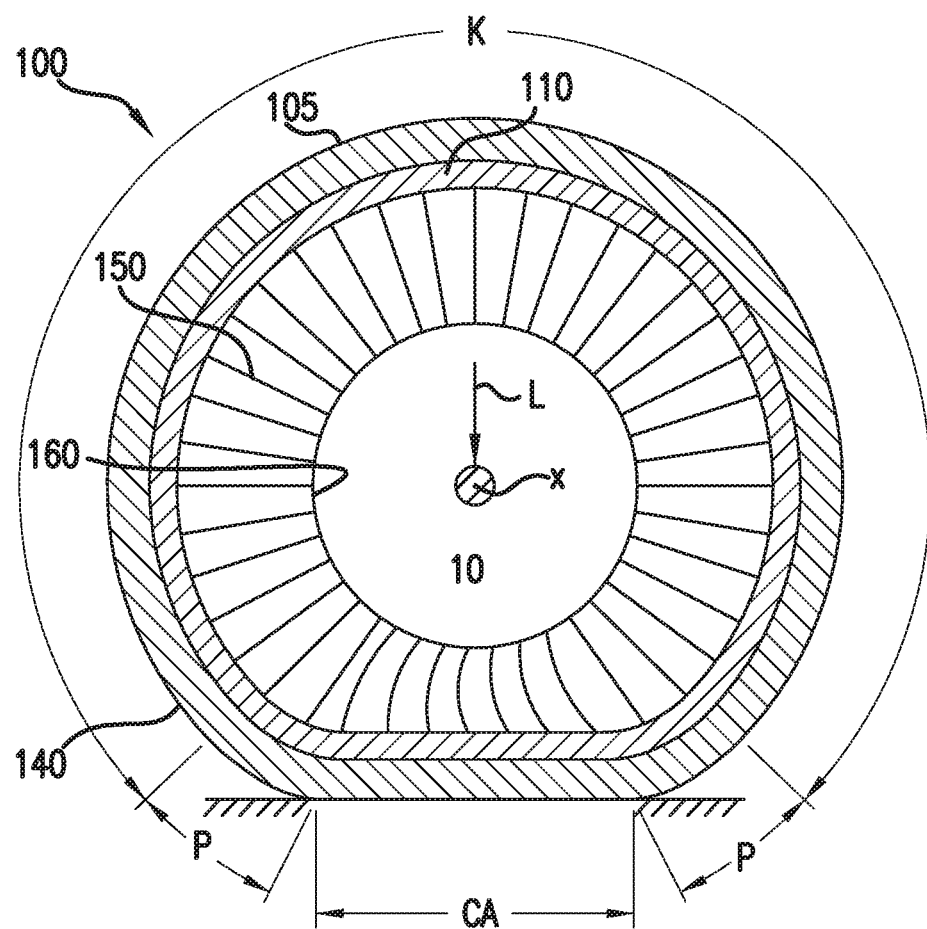
FIG. 1 provides a schematic side view of an exemplary embodiment of a tire incorporating a shear band.

Embodiments of the present invention include a shear band that is useful for non-pneumatic tires and more particularly, to the rubber compositions that form the shear layer of the annular shear band. As noted above, the shear band concept has been used in many different embodiments of non-pneumatic tires and is well known in the industry. The improvement to the shear bands that is provided herein provides remarkably improved rolling resistance—and therefore improved fuel economy—when included in a non-pneumatic tire. It should be noted that non-pneumatic tires include those that are designed as run-flat tires, i.e., designed to run for some distance after they have lost their inflation pressure. Shear bands having an interlaced arrangement of reinforcing elements positioned in its annular shear layer are known and are described in international patent application PCT/U.S. Pat. No. 1,166,793 filed on Dec. 22, 2011.

The inventors have determined that the shear bands disclosed herein are operated in a high-strain regime, e.g., greater than 70% strain or even greater than 80%. These shear bands include the annular shear layer having a plurality of discrete, annular reinforcing elements positioned along a plurality of axially-oriented rows throughout the annular shear layer as is described in greater detail below. It is these reinforcing elements of the shear band that support the load and the annular shear layer, which is made of an elastomeric material, acts mainly to hold these reinforcements in place. It is also a result of the design that the reinforcement architecture has a very low strain energy release resulting in slow crack propagation rates.

The import of this is that the material useful for the annular shear layer of the shear band can be a material that is not currently found in tires. In other words, the material may show low hysteresis at high strain amplitudes, e.g., greater than 70% strain or greater than 80% strain but not be particularly concerned about low crack propagation rates or cohesive and tear properties of such elastomeric materials.

It is interesting to note that while most tire designers search for low hysteretic materials at less than 50% strain (as measured by its tan delta at 23° C. in accordance with ASTM D5992-96), in embodiments disclosed herein it is preferable to have low hysteretic materials at around 70%-80% strain because the shear layer is operating in that strain regime. Materials that may have a reasonable tan delta at lower strains have an increased tan delta at higher strains. Therefore, the useful materials for the shear layer are those that also include the property of low hysteresis at around 80% strain.

Therefore particular embodiments of the shear layers disclosed herein are rubber compositions that include—prior to their vulcanization—between 50 phr and 100 phr of natural rubber and between 0 phr and 50 phr of a second rubber component that may be selected from e.g., polybutadiene rubber, a copolymer of polybutadiene and styrene but with no more than 5 mol % styrene or combinations of such rubber components.

In addition such embodiments are reinforced with a low reinforcing filler content such as from between 20 phr and 40 phr, of which no more than 35 phr may be carbon black having a surface area of between 25 m²/g and 39 m²/g. This keeps the hysteresis of the material at an ultra-low level but includes enough reinforcement to provide the cohesion and strain at break properties that may be preferred for different embodiments.

As noted above, the shear bands disclosed herein use interlaced reinforcing elements positioned within the shear layer of elastomeric material. A variety of configurations may be used to create the interlaced positioning of the reinforcing elements. For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

The following terms are defined as follows for this disclosure:

"Axial direction" or the letter "A" in the figures refers to a direction parallel to the axis of rotation of e.g., the shear band, tire, and/or wheel as it travels along a road surface.

"Radial direction" or the letter "R" in the figures refers to a direction that is orthogonal to the axial direction and extends in the same direction as any radius that extends orthogonally from the axial direction.

"Equatorial plane" means a plane that passes perpendicular to the axis of rotation and bisects the shear band and/or wheel structure.

"Interlaced" refers to the manner in which discrete reinforcements or reinforcing elements of the shear band are arranged within the shear layer as will be further described with reference to the figures. Where reinforcing elements are interlaced along the axial direction, imaginary lines extending between the center points of the reinforcing elements in adjacent, axially oriented rows will form a rhombus or horizontal diamond having non-orthogonal angles between the sides of the rhombus. In this interlaced, horizontal diamond configuration, the reinforcing elements of adjacent, axially-oriented rows are closer together than reinforcing elements within the same axially-oriented row. Where reinforcing elements are interlaced along the radial direction, imaginary lines extending between the center point of reinforcing elements in adjacent, axially oriented rows will form a rhombus or vertical diamond having non-orthogonal angles between the sides of the rhombus. In this interlaced, vertical diamond configuration, the reinforcing elements along the same, axially-oriented row will be closer together than reinforcing elements in non-adjacent, axially-oriented rows. As will be understood by one of skill in the art using the teachings disclosed herein, during tire manufacture a perfect positioning of reinforcing elements into the shape of a vertical or horizontal diamond may not be possible due to e.g., the movement of materials during the manufacturing process. As such, slight displacements of the reinforcement elements of either diamond configuration can occur.

As used herein, "phr" is "parts per hundred parts of rubber by weight" and is a common measurement in the art wherein components of a rubber composition are measured relative to the total weight of rubber in the composition, i.e., parts by weight of the component per 100 parts by weight of the total rubber(s) in the composition.

As used herein, "based upon" is a term recognizing that embodiments of the present invention are made of vulcanized or cured rubber compositions that were, at the time of their assembly, uncured. The cured rubber composition is therefore "based upon" the uncured rubber composition. In other words, the cross-linked rubber composition is based upon or comprises the constituents of the cross-linkable rubber composition.

Figure 2:
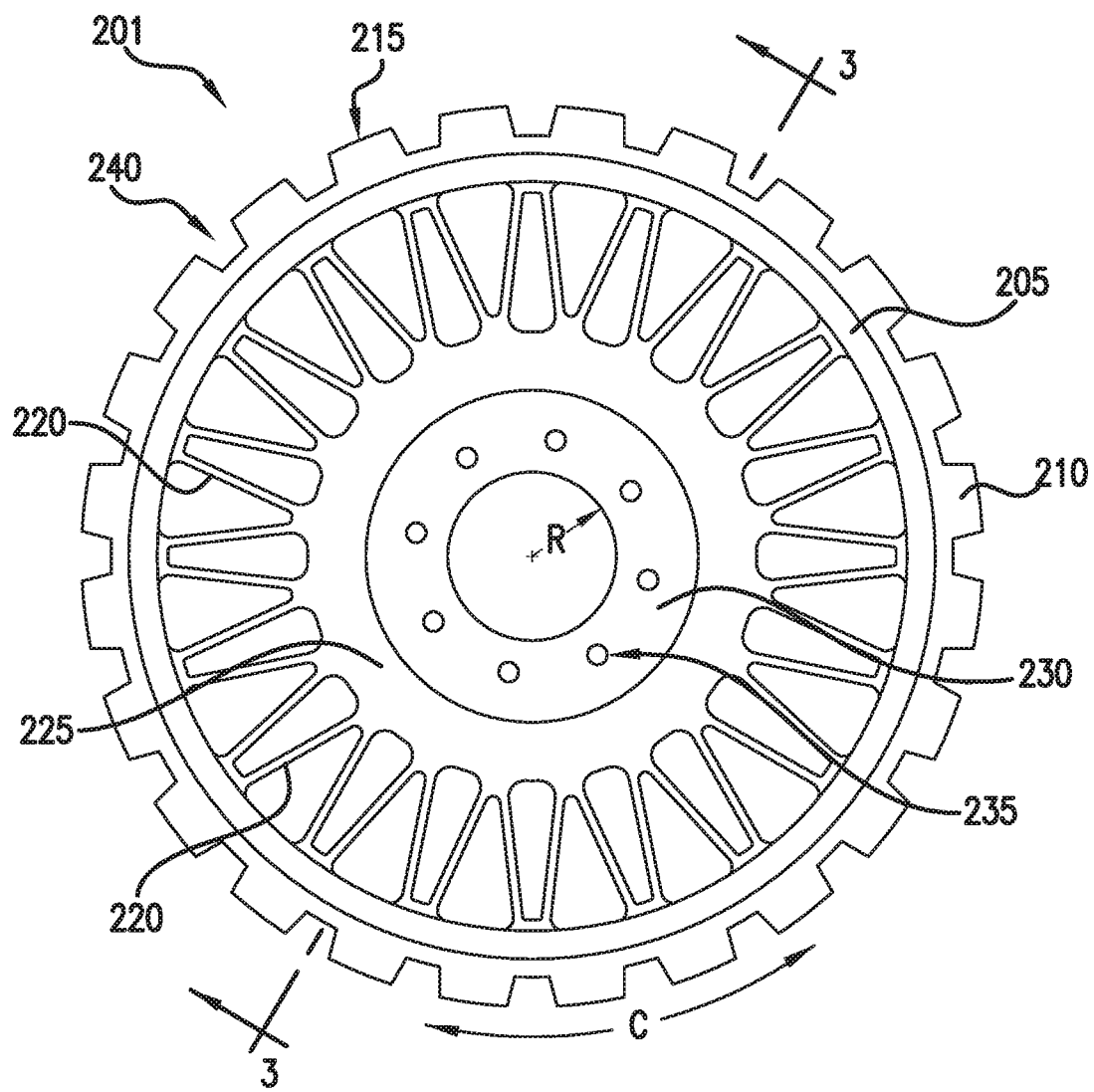
FIG. 2 provides a perspective view of the exemplary embodiment of a tire incorporating a shear band of the present invention.
Figure 3:
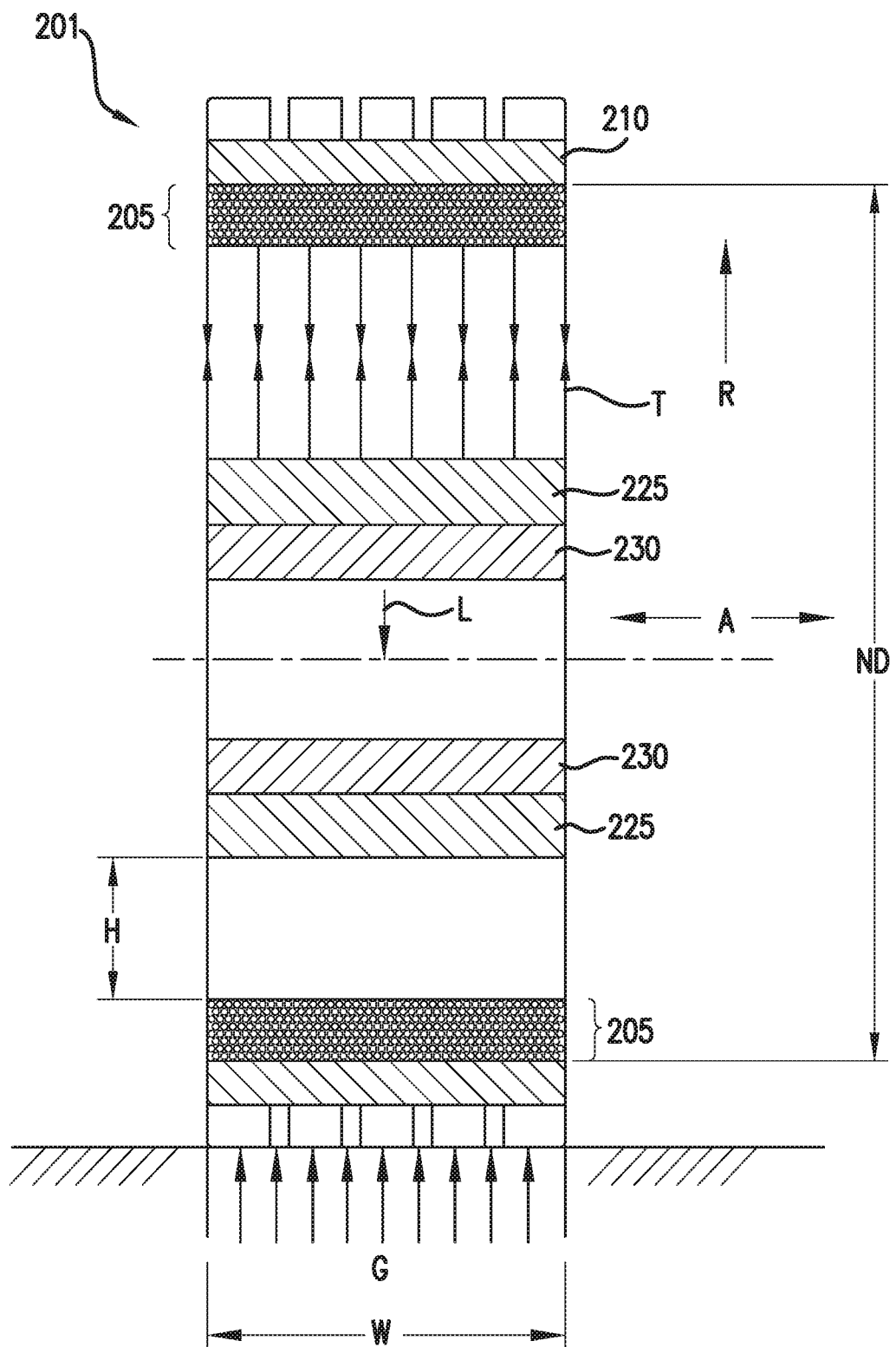
FIG. 3 provides a cross-sectional view of the tire of FIG. 2 as taken along line 3-3 in FIG. 2.

The Architecture of an Exemplary Non-Pneumatic Tire. FIG. 2 provides an exemplary embodiment of a non-pneumatic tire 201 as may incorporate a shear band of the present invention. FIG. 3 provides a cross-sectional view of tire 201 taken along line 3-3 in FIG. 2. Tire 201 as shown in FIGS. 2 and 3 has an annular shear band 205 and a plurality of tension transmitting elements, illustrated as web spokes 220, extending transversely across and inward from band 205, to a mounting band 225, at the radially inner end of the web spokes 220. Mounting band 225 anchors tire 201 to a hub 230 with holes 235 for mounting. Tire 201 can be mounted onto hub 230 or can be constructed integrally with hub 230.

A tread portion 210 is formed at the outer periphery of band 205. Tread portion 210 may be an additional rubber layer bonded on the band 205 as shown in FIG. 2, for example, so as to provide different traction and wear properties than the material used to construct band 205. Alternatively, tread portion 210 may be formed as part of the outer surface of the compliant band 205. In still another alternative, band 205 may be enclosed within one or more rubber materials connected with tread portion 210. Tread features may be formed in the tread portion 210 and may include blocks 215 and grooves 240.

As mentioned, web spokes 220 in the exemplary embodiment of FIGS. 2 and 3 extend transversely across wheel 201, which as used herein means that the web spokes 220 extend from side to side of wheel 201 and may be aligned with the axis of rotation, or may be oblique to the wheel axis. Further, "extending inward" means that web spokes 220 extend between band 205 and mounting band 225, and may lie in a plane radial to the wheel axis or may be oblique to the radial plane. In addition, as shown in FIG. 2, web spokes 220 may actually include spokes at different angles to the radial plane. Various shapes and patterns may be used as shown, e.g., in U.S. Pat. No. 7,013,939 and WO 2008/118983. Accordingly, as will be understood by one of ordinary skill in the art, the present invention is not limited to the radial spokes shown in the figures as other shapes and orientations may be used as well as a different number of spokes than is shown.

Annular shear band 205 supports the load on wheel 201 and resiliently deforms to conform to the road (or other supporting surface) to provide traction, comfort, and handling capabilities. More particularly, as described in U.S. Pat. No. 7,013,939, when a load L is placed on the wheel 201 through hub 230, band 205 acts compliantly in that it bends and otherwise deforms for ground contact (arrows G in FIG. 3 of the present application) and forms a contact patch, which is the portion of wheel 201 that is in contact with the ground under such load. The portion of band 205 that is not in ground contact acts in a manner similar to an arch and provides a circumferential compression stiffness and a longitudinal bending stiffness in the equatorial plane sufficiently high to act as a load-supporting member.

The load on the wheel 201, transmitted from the vehicle (not shown) to hub 230 essentially hangs by web spokes 220 (e.g., tensile forces as shown by arrows T in FIG. 3) attached to the load supporting portion of band 205 (indicated by arrows K in FIG. 1). Web spokes 220 in the ground contacting region do not experience tensile loading due to the load—and, e.g., in certain exemplary embodiments spokes 220 can even buckle under load above the ground contacting region. As wheel 201 rotates, of course, the specific portion of the compliant band 205 acting as an arch continually changes, however, the concept of an arch is useful for understanding the load supporting mechanism. The amount of bending of band 205, and accordingly, the size of the contact patch is proportional to the load. The ability of band 205 to bend resiliently under the load provides a compliant ground contact area that acts similar to that of a pneumatic tire, with similar advantageous results.

Still referring to FIGS. 2 and 3, web spokes 220 are substantially sheet-like elements having a length H in the radial direction, a width W in the axial direction corresponding generally to the axial width of the compliant band 205, although other widths W may be used including widths W that vary along the radial direction. Web spokes 220 also have a thickness (i.e. a dimension perpendicular to length H and width W) that is generally much less than either the length H or the width W, which allows a web spoke to buckle or bend when under compression. Thinner web spokes will bend when passing through the contact area with substantially no compressive resistance, that is, supplying no or only insignificant compressive force to load bearing. As the thickness of web spokes 220 is increased, the web spokes may provide some compressive load bearing force in the ground contact area. The predominant load transmitting action of web spokes 220 as a whole, however, is in tension (arrows T in FIG. 3). The particular web spoke thickness may be selected to meet the specific requirements of the vehicle or application.

As seen in FIGS. 2 and 3, preferably, web spokes 220 are oriented relative to the compliant band 205 across the axial direction A. Tension in web spokes 220 is, therefore, distributed across band 205 to support the load. By way of example, web spokes 220 may be formed of an elastomeric material having a tensile modulus of about 10 to 100 MPa. Web spokes 220 may be reinforced if desired.

For the exemplary embodiment of FIGS. 2 and 3, web spokes 220 are interconnected by radially inner mounting band 225, which encircles the hub 230 to mount tire 201 to the hub 230. Depending on the construction materials and manufacturing process, hub 230, mounting band 225, annular band 205, and web spokes 220 may be molded as single unit. Alternatively, one or more of such components may be formed separately and then attached to each other through e.g., adhesives or molding. Additionally, other components may be included as well. For example, an interface band can be used to connect web spokes 220 at their radially outer ends, and then the interface band would be connected to band 205.

According to a further embodiment, web spokes 220 could be mechanically attached to hub 230, for example, by providing an enlarged portion on the inner end of each web spoke 220 that engages a slot device in hub 230, or by attaching adjacent web spokes 220 to form a loop at a hook or bar formed in hub 230. Substantially purely tensile load support is obtained by having a web spoke 220 that has high effective stiffness in tension but very low stiffness in compression. To facilitate bending in a particular direction, web spokes 220 may be curved. Alternatively, web spokes 220 can be molded with a curvature and straightened by thermal shrinkage during cooling to provide a predisposition to bending in a particular direction.

Web spokes 220 should resist torsion between annular band 205 and hub 230, for example, when torque is applied to wheel 201. In addition, web spokes 220 should resist lateral deflection when, for example, turning or cornering. As will be understood, web spokes 220 that lie in the radial-axial plane, that is, are aligned with both the radial and axial directions, will have high resistance to axially directed forces, but, particularly if elongated in the radial direction R, may have relatively low resistance to torque in the circumferential direction C.

For certain vehicles and applications, for example, those producing relatively low torque, a web spoke package having relatively short spokes 220 aligned with the radial direction R will be suitable. For applications where high torque is expected, one of the arrangements such as shown in FIGS. 5 through 8 of U.S. Pat. No. 7,013,939 may be more suitable. In the variations shown therein, orientations of web spokes are provided that include a force-resisting component in both the radial and the circumferential directions, thus adding resistance to torque, while retaining radial and lateral force-resisting components. The angle of orientation may be selected depending on the number of web spokes used and the spacing between adjacent web spokes. Other alternative arrangements may also be used.

It should be understood that the present invention is not limited to tire 201 as shown in FIG. 2 and, instead, a variety of configurations may be employed. For example, tire 201 could be constructed with the shear band incorporated into a rubber layer such that e.g., sidewalls cover the axial outermost sides of the shear band.

Shear Band.

Figure 4:
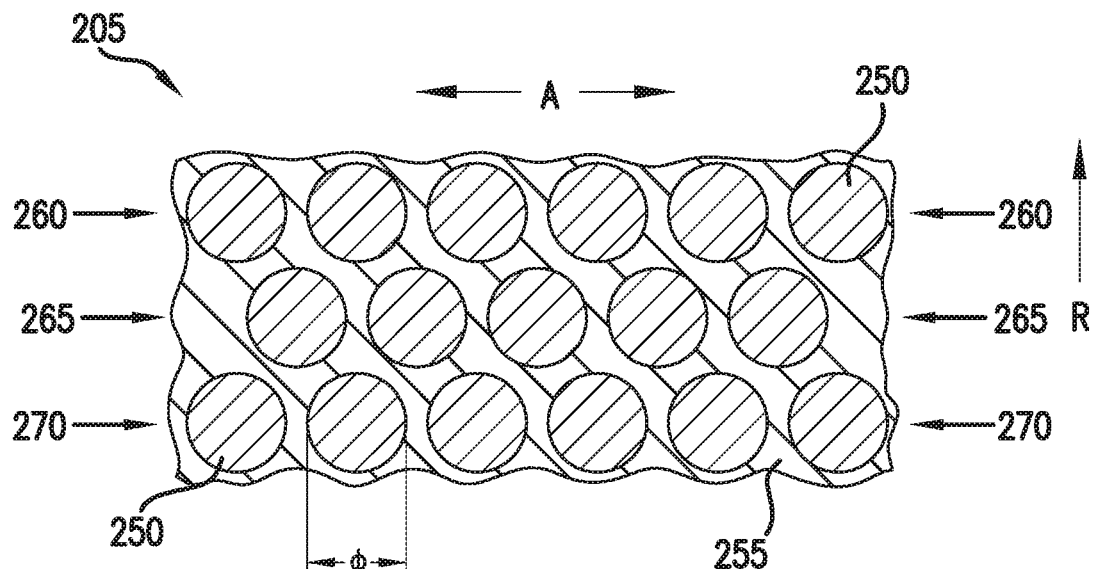
FIG. 4 is a cross-sectional view (taken along line 3-3 of FIG. 2) of a portion of an exemplary embodiment of a shear band as may be used with a non-pneumatic tire such as that shown in FIGS. 1 and 2.

As shown more particularly in the partial cross section view of FIG. 4, annular shear band 205 includes a plurality of discrete, reinforcing elements 250 positioned within an annular shear layer 255 constructed from an elastomeric material. Reinforcing elements 250 are positioned along axially-oriented rows such as e.g., rows 260, 265, and 270. For the exemplary embodiment of FIG. 4, reinforcing elements 250 are interlaced along the radial direction R.

Figure 5:
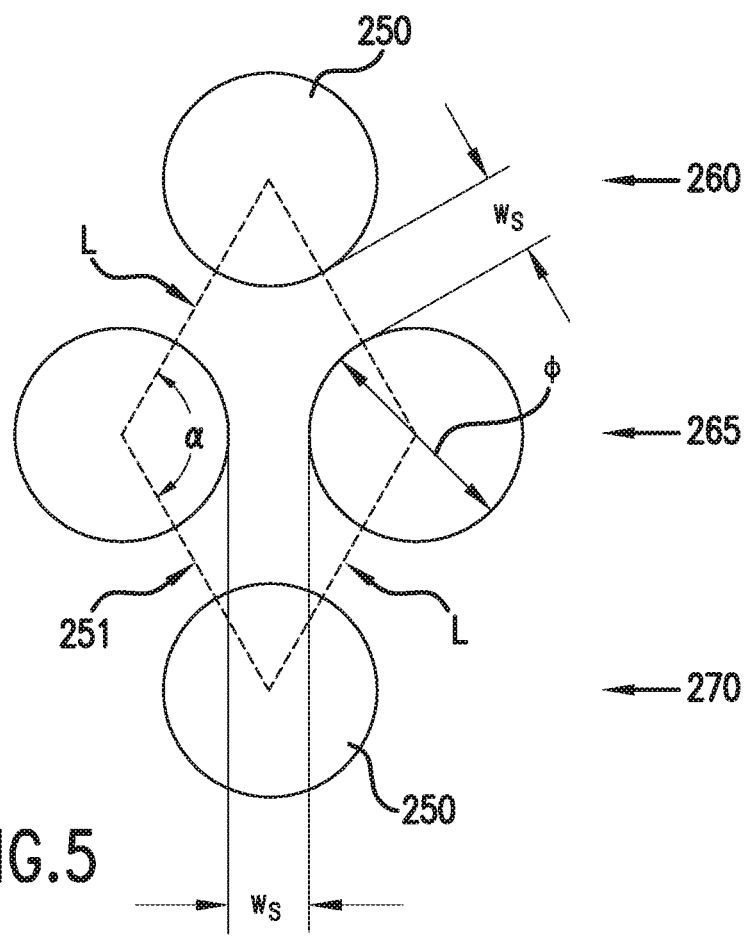
FIG. 5 is a schematic representation of exemplary positioning (e.g., interlaced) of reinforcing elements of the present invention as can be used e.g., in the shear band of FIG. 4.

More specifically, referring now to the schematic representation shown in FIG. 5, reinforcing elements 250 are arranged such that imaginary lines L (shown in phantom) extending between the center point of reinforcing elements 250 located in adjacent, axially oriented rows 260, 265, and 270 will form a rhombus or vertical diamond 251 having an obtuse angle $\alpha$ between certain sides L of the rhombus. Also, reinforcing elements 250 along the same, axially oriented row (such as reinforcing elements in e.g., row 265) will be closer together than reinforcing elements in non-adjacent, axially-oriented rows (such as the reinforcing elements in row 260 relative to row 270).

Figure 6:
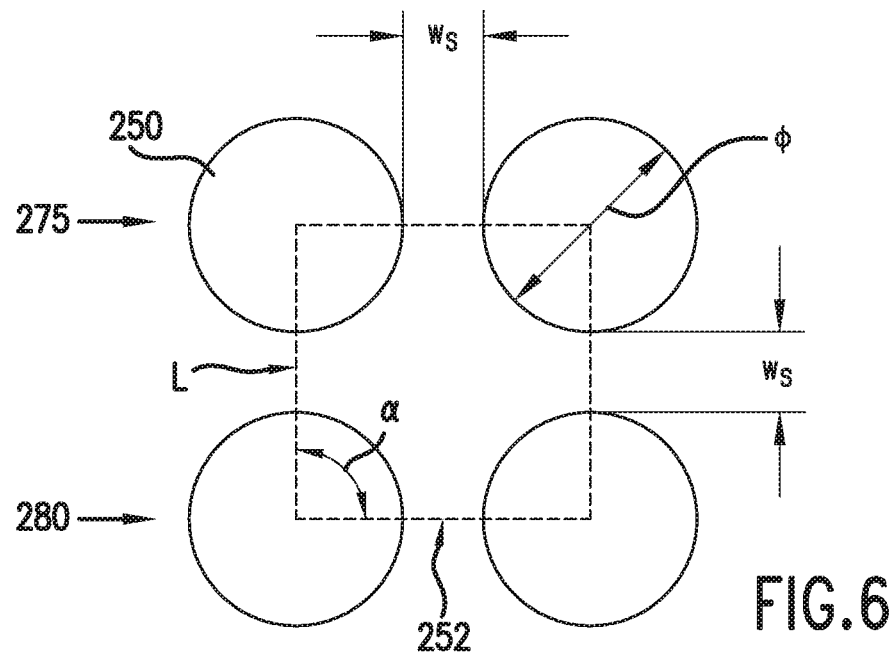
FIGS. 6 and 7 provide schematic representations of non-interlaced reinforcing elements.
Figure 7:
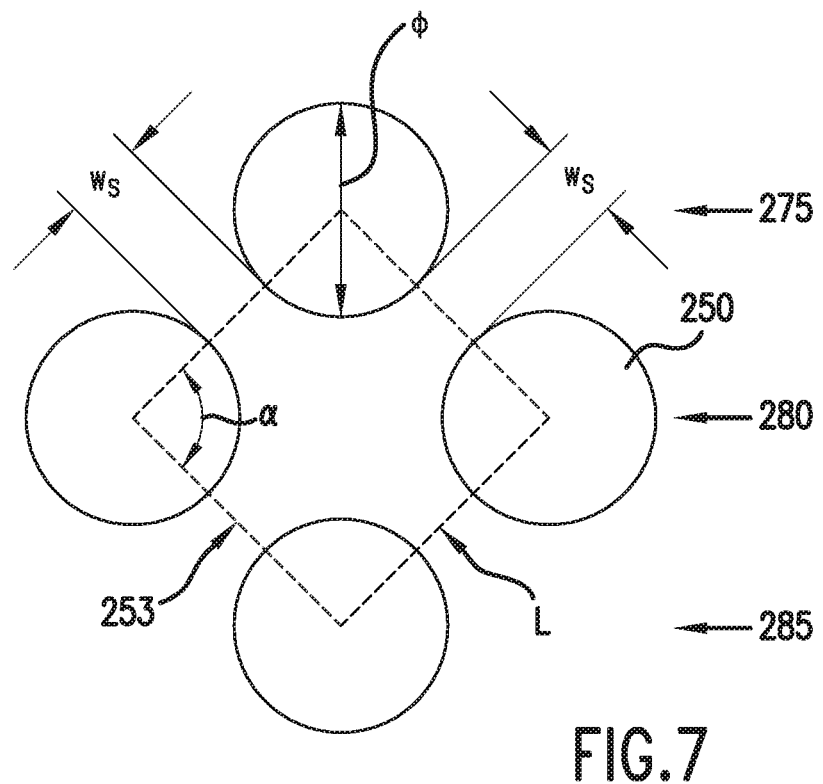

For the sake of clarity, FIGS. 6 and 7 illustrate a positioning of reinforcing elements 250 that are not "interlaced" within the meaning of the present application. In the examples of FIGS. 6 and 7, the centers of reinforcing elements 250 are positioned along a rhombus 252 or 253, respectively. However, angle $\alpha$ as used in these examples is at 90 degrees and reinforcing elements 250, whether along the same or different axially-oriented rows 275, 280, and 285, are all equally spaced.

Figure 8:
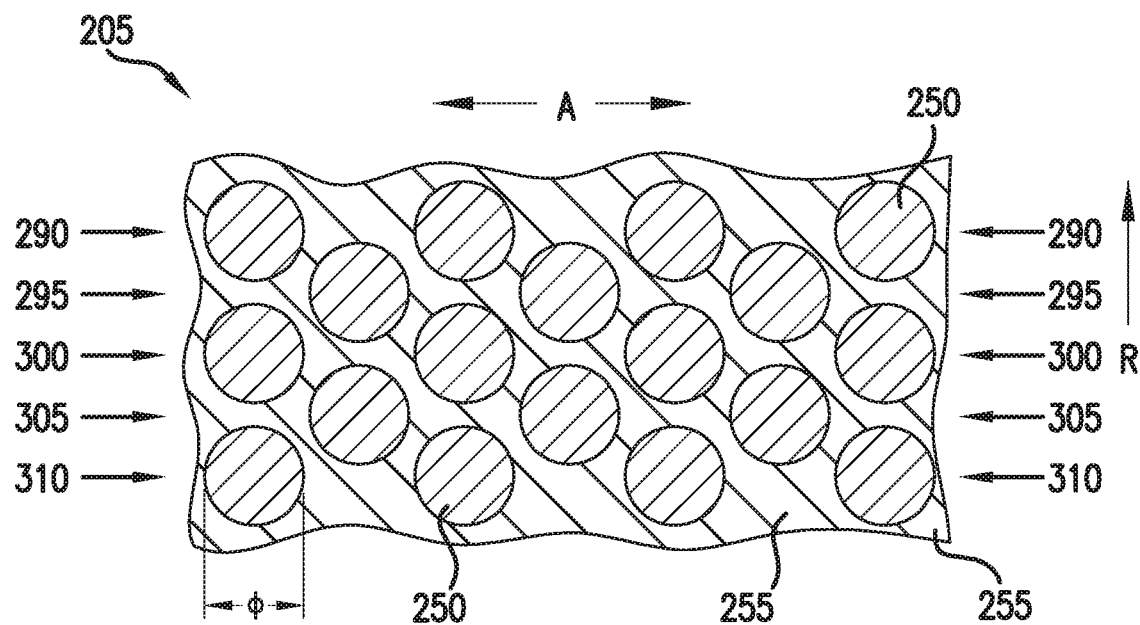
FIG. 8 is a cross-sectional view of a portion of an exemplary embodiment of a shear band as may be used with a non-pneumatic tire such as that shown in FIGS. 1 and 2.

FIG. 8 provides a partial cross sectional view of another exemplary embodiment of shear band 205. Again, annular shear band 205 includes a plurality of discrete, reinforcing elements 250 positioned within an annular shear layer 255 constructed from an elastomeric material. Reinforcing elements 250 are positioned along axially-oriented rows such as e.g., rows 290, 295, 300, 305, and 310. For the exemplary embodiment of FIG. 8, reinforcing elements 250 are interlaced along the axial direction A.

Figure 9:
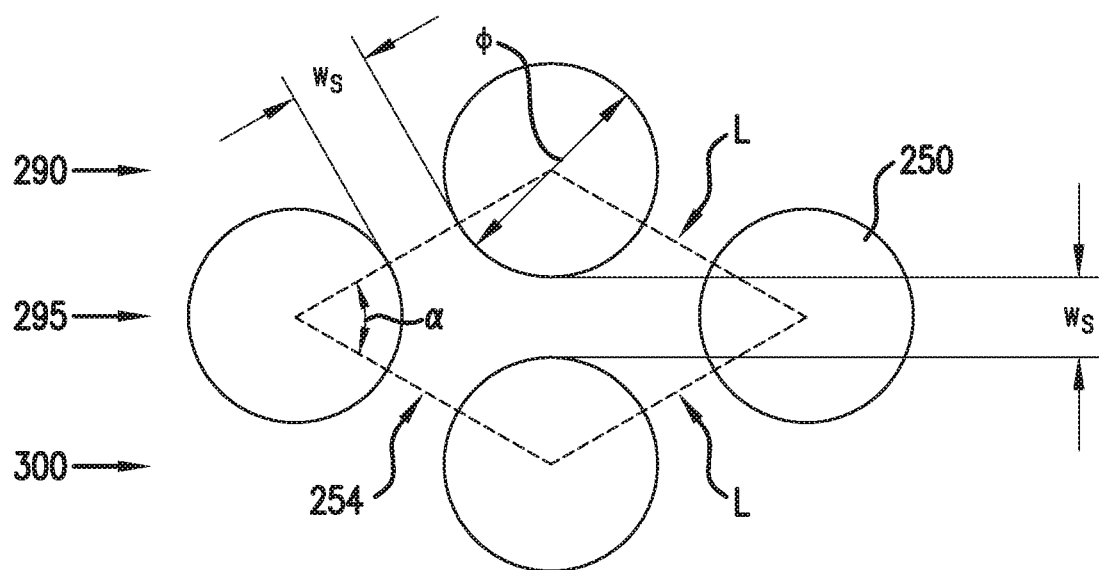
FIG. 9 is a schematic representation of an exemplary positioning (e.g., interlaced) of reinforcing elements of the present invention as can be used e.g., in the shear band of FIG. 8.

More specifically, referring now to the schematic representation shown in FIG. 9, reinforcing elements 250 are arranged such that imaginary lines L (shown in phantom) extending between the center point of reinforcing elements 250 located in adjacent, axially oriented rows 290, 295, 300, 305, and 310 will form a rhombus or horizontal diamond 254 having an acute angle $\alpha$ between certain sides L of the rhombus 254. Additionally, the reinforcing elements 250 along adjacent, axially-oriented rows (such as the reinforcing elements in row 290 relative to row 295 or in row 295 relative to row 300) will be closer together than reinforcing elements positioned along the same, axially-oriented row (such as reinforcing elements 250 in e.g., row 290 or in row 295).

Returning to the interlaced, vertical diamond configuration of FIGS. 4 and 5, reinforcing elements 250 each have a nominal diameter $\Phi$ as shown. In certain exemplary embodiments of the invention, the spacing ws between the reinforcing elements 250 that are positioned along an axially-oriented row (such as e.g., row 265) is in the range of about Φ/2 to about Φ/10, or is about Φ/4. Additionally, in certain exemplary embodiments of the invention, the spacing between the reinforcing elements 250 that are positioned in adjacent, axially-oriented rows (such as e.g., rows 260 and 265 or rows 265 and 270) is in the range of about Φ/2 to about Φ/10, or is about Φ/4.

Returning to the interlaced, horizontal diamond configuration of FIGS. 8 and 9, again reinforcing elements 250 each have a nominal diameter 1 as shown. The reinforcing elements 250 are separated from one another by a predetermined distance, ws. In certain exemplary embodiments of the invention, the spacing ws between the reinforcing elements 250 that are positioned in adjacent, axially-oriented rows (such as e.g., rows 290 and 295 or rows 295 and 300) is in the range of about Φ/2 to about Φ/10, or is about Φ/4. Additionally, in certain exemplary embodiments of the invention, the spacing between the reinforcing elements 250 that are positioned in non-adjacent, axially-oriented rows (such as e.g., rows 290 and 300 or rows 295 and 305) is in the range of about Φ/2 to about Φ/10, or about Φ/4.

Reinforcing elements 250 can be constructed from a variety of materials. For example, reinforcing elements 255 can be constructed from metallic cables, or cables that are constructed from polymeric monofilaments such as PET (polyethylene terephthalate), or nylon. By way of additional example, reinforcing elements 250 could be constructed from elongate composite elements of monofilament appearance made with substantially symmetrical technical fibers, the fibers being of great lengths and impregnated in a thermoset resin having an initial modulus of extension of at least 2.3 GPa, in which the fibers are all parallel to each other. In such embodiment, the elongate composite elements will deform in an elastic manner up to a compressive strain of at least equal to 2%. As used herein, an elastic deformation means that the material will return approximately to its original state when the stress is released. When the elongate composite elements are deformed in bending, they will have a breaking stress in compression greater than the breaking stress in extension, all as set forth in e.g., U.S. Pat. No. 7,032,637, which is incorporated herein by reference. By way of example, the fibers could be constructed from glass, certain carbon fibers of low Young's modulus, and combinations thereof. Preferably, the thermoset resin has a glass transition temperature $T_g$ greater than 130° C. Advantageously, the initial modulus of extension of the thermoset resin is at least 3 GPa. Reinforcing elements 250 could also be constructed from combinations of PET and such elongate composite elements.

Additionally, reinforcing elements 255 could be constructed from hollow tubes made from rigid polymers such as e.g., PET or nylon. Other materials may be used as well. In certain exemplary embodiments of the invention, preferably reinforcing elements 250 each have a nominal diameter Φ that is in the range of about ND/200 to about ND/1000, where ND is the nominal diameter of shear band 205 (see FIG. 3).

Shear Layer.

As noted above, the shear band disclosed herein operates in a high strain regime and it has been determined that the selection of the material used in the shear layer has significant impact on the rolling resistance. Since the material is not load-supporting and crack propagation resistance is not particularly important because of the design of the shear layer, different material properties—and therefore different materials—can be considered that would not typically be useful in a tire.

The shear band and the shear layer of the embodiments disclosed herein are useful in many different non-pneumatic tire arrangements and the descriptions of examples of non-pneumatic tires having a shear band as described above are not meant to limit the designs of non-pneumatic tires that would benefit from the use of the shear bands disclosed herein.

Since the shear band is operating in the high strain regime, it is preferred that the hysteresis at high strain be as low as possible so that the rolling resistance can be reduced. Since the shear layer is not providing support but mostly just holding the reinforcements in place, the properties of resistance to crack propagation, tear properties and cohesion are not as important as they would generally be in a tire so those properties can be relaxed to provide the lowest possible hysteresis of the rubber composition.

A preferred material for the shear layer is a rubber composition. Particular embodiments of the rubber compositions disclosed herein that are suitable for the shear layer include diene rubbers resulting at least in part from conjugated diene monomers having a content of such monomers that is greater than 50 mol %. Such diene elastomers suitable for the shear layer include, for example, natural rubber (NR), polybutadiene rubber BR) and copolymers of polybutadiene rubber and styrene (SBR). The use of these diene rubbers are particularly useful in obtaining the ultra-low hysteresis that is desired for the shear layer. For particular embodiments the SBR copolymers are limited to having no more than 5 mol % bound styrene since higher amounts may provide undesired increases in the hysteresis of the rubber composition. However, when the SBR is functionalized with a moiety that can interact with a silica reinforcing filler, then the bound styrene content may be higher such as, for example, between 1 mol % and 35 mol % or alternatively between 1 mol % and 30 mol % or between 1 mol % and 20 mol % bound styrene content. In particular embodiments, higher bound styrene content, i.e., above 30 mol %, is not useful. Functionalized rubbers, i.e., those appended with active moieties, are well known in the industry and such rubbers may be functionalized by attaching these active moieties to the polymer backbone, along the branches of the polymer or at the branch ends of the polymer. Suitable functionalizing moieties that interact with a silica filling include, for example, silanol groups, polysiloxane groups, alkoxysilane groups and amino groups.

These rubbers, at least for some of the embodiments disclosed herein, may have any microstructure, such microstructure being a function of the polymerization conditions used, in particular of the presence or absence of a modifying and/or randomizing agent and the quantities of modifying and/or randomizing agent used. The elastomers may, for example, be block, random, sequential or micro-sequential elastomers, and may be prepared in dispersion or in solution; they may be coupled and/or starred or alternatively functionalized with a coupling and/or starring or functionalizing agent.

As noted for the functionalized SBR above, functionalized rubbers, i.e., those appended with active moieties, are well known in the industry. The backbone or the branch ends of the elastomers may be functionalized by attaching these active moieties to the ends of the chains or to the backbone or mid-chains of the polymer. Any of the rubbers used in the rubber compositions disclosed herein may optionally include a functional moiety. Exemplary functionalizing agents that could be included with the diene elastomers include, but are not limited to, metal halides, metalloid halides, alkoxysilanes, imine-containing compounds, esters, ester-carboxylate metal complexes, alkyl ester carboxylate metal complexes, aldehydes or ketones, amides, isocyanates, isothiocyanates and imines—all of these being well-known in the art. Particular embodiments may include functionalized diene elastomers while other embodiments may be limited to including no functionalized elastomers.

Particular embodiments of the rubber compositions disclosed herein may include between 50 phr and 100 phr of natural rubber or alternatively between 60 phr and 100 phr, between 75 phr and 100 phr or between 85 phr and 100 phr of natural rubber. Particular embodiments may be limited to 100 phr of natural rubber. If less natural rubber is included then the target ultra-low hysteresis of the cured rubber composition may not be achieved. If greater amounts of the polybutadiene are included, then the cohesive properties of the rubber composition are not suitable, i.e., the strain at break is not enough greater than the strain regime in which the shear layer is operating.

In addition to the natural rubber, the rubber compositions may include between 0 phr and 50 phr of a second rubber component selected from the group polybutadiene rubber or a styrene-butadiene copolymer with a bound styrene content of no more than 5 mol % or alternatively no more than 3 mol %. Particular embodiments may be limited to 0 phr of the second rubber component or alternatively to 0 phr of the SBR copolymer. The inclusion of just these rubber components can help ensure that the ultra-low hysteresis targets may be reached for the disclosed rubber compositions. As has been noted above, when the SBR is functionalized with a moiety that interacts with a silica reinforcing filler, the embodiments of the rubber compositions disclosed herein that are reinforced at least in part with a silica filler may further include between 0 phr and 20 phr of the functionalized SBR component or alternatively between 0 phr and 15 phr or between 0 phr and 10 phr of the functionalized SBR. In particular embodiments, the amount of such functionalized SBR is limited to 0 phr.

In addition to the rubber components, the rubber compositions disclosed herein further include a reinforcing filler. Reinforcing fillers are added to rubber compositions typically to improve, inter alia, their tensile strength and their rigidity. Reinforcing fillers that are very well known in the industry include, for example, carbon black and silica.

The carbon blacks that are useful for the rubber compositions disclosed herein are quite limited since other carbon blacks will likely fail to provide the ultra-low hysteresis properties that are targeted along with the other desired properties. In particular embodiments, the carbon blacks are limited to those having a targeted surface area of between 25 $m^2/g$ and 39 $m^2/g$ or alternatively between 32 $m^2/g$ and 39 $m^2/g$ as measured in accordance with ASTM D6556. In accordance with ASTM D1765 Standard Classification of Carbon Blacks, those carbon blacks having a surface area of between 25 $m^2/g$ and 32 $m^2/g$ are classified as Group No. 7 and those carbon blacks having a surface area of between 33 $m^2/g$ to 39 $m^2/g$ are classified as Group No. 6. Examples of such Group No. 6 carbon blacks include N630, N650, N660, N683 and examples of such Group No. 7 carbon blacks include N754, N762, N765, N772 and N787. Small amounts of carbon blacks that fall outside these desirable ranges may be included in particular embodiments but in other embodiments, no carbon blacks having a surface area outside these targeted surface area ranges would be acceptable.

Silica is another suitable reinforcing filler and is an inorganic filler. Silica may take many useful forms including, for example, as powder, microbeads, granules, balls and/or any other suitable form as well as mixtures thereof. Such silicas may be fumed, precipitated and/or highly dispersible silica (known as "HD" silica).

Useful silicas are those that have a surface area of between 25 $m^2/g$ and 39 $m^2/g$ or alternatively, between 29 $m^2/g$ and 39 $m^2/g$ or between 30 $m^2/g$ and 35 $m^2/g$. Examples of useful silicas may include, for example Silene 732D (powder form, surface area 35 $m^2/g$) available from PPG and Ultrasil 880 (powder form, 35 $m^2/g$), which is available from Evonik. The surface area for silica fillers is determined in accordance with ASTM D1993. These useful silicas are typically in powder form.

To obtain the desired physical properties of the rubber compositions, the loadings of the reinforcing fillers are low. If the loadings become too high, then the ultra-low hysteresis targets cannot be achieved and if the loadings are too low, there is not enough reinforcement of the rubber compositions to hold together and hold the shear band reinforcements in place.

Therefore the rubber compositions may include between 15 phr and 40 phr or between 20 phr and 40 phr of the reinforcing fillers but is limited to containing no more than 35 phr of total carbon black or alternatively less than 30 phr, no more than 27 phr, no more than 20 phr, no more than 10 phr or no more than 5 phr of carbon black. The total amount of carbon black includes that amount that falls into the targeted surface area (between 25 $m^2/g$ and 39 $m^2/g$ or alternatively between 32 $m^2/g$ and 39 $m^2/g$) as well as any small amount that may fall outside this targeted surface area. Such small amount is limited to between 0 phr and 5 phr or alternatively between 0 phr and 3 phr. In particular there is 0 phr of carbon black that falls outside the targeted surface area for suitable carbon blacks.

The reinforcing fillers may be carbon black or a combination of carbon black and silica. In particular embodiments, the reinforcing filler may be limited to just carbon black.

In embodiments of the rubber compositions that include just carbon black, the amount of carbon black included in the rubber composition may range between 15 phr and 35 phr, or alternatively less than 30 phr, between 15 and less than 30 phr, between 17 phr and 35 phr or between 17 phr and less than 30 phr, between 20 phr and 35 phr, between 20 phr and 27 phr or between 20 phr and less than 30 phr of carbon black.

In those embodiments that include a combination of silica and carbon black, the total amount of filler is no more than 40 phr and the amount of carbon black is at least 5 phr, the remainder being silica. The ratio by weight of carbon black to silica is not particularly limited but may range, e.g., between 1:7 and 7:1 or alternatively between 1:5 and 5:1, between 1:3 to 3:1 or between 1:2 and 2:1. That is to say, the amount of carbon black may range about between 12 wt % and 88 wt % of the total amount of reinforcing filler or alternatively between 17 wt % and 83 wt %, between 25 wt % and 75 wt % or between 33 wt % and 66 wt % carbon black of the total amount of reinforcing filler.

For those embodiments that include silica as a reinforcing filler, a silica coupling agent may be included. Such coupling agents are well known and are at least bifunctional to provide a sufficient chemical and/or physical connection between the inorganic reinforcing filler and the diene elastomer. Examples of such coupling agents include bifunctional organosilanes or polyorganosiloxanes. Particular well known examples of coupling agents include 3,3'-bis(triethoxysilylpropyl)disulfide (TESPD) and 3,3'-bis(triethoxysilylpropyl)tetrasulfide (TESPT).

To obtain the best rolling resistance for tires having the shear band disclosed herein, the shear layer is made of the rubber compositions discussed above to provide the ultra-low hysteresis with sufficient rigidity and rubber cohesion to hold the shear band reinforcements in place. Particular embodiments of the rubber compositions therefore possess the following set of physical properties: an ultra-low hysteresis as determined by the tan delta measured at 23° C. and at 80% strain of between 0.013 and 0.025 or alternatively between 0.013 and 0.022; a shear modulus G* measured at 23° C. and at 80% strain of at least 1.30 MPa or alternatively between 1.30 MPa and 1.80 MPa, and a strain at break of greater than 80% or alternatively between 80% and 350%, between 80% and 200%, between 100% and 350% or between 100% and 200%.

In addition to the rubber components and the reinforcing fillers discussed above, the rubber compositions disclosed herein may further include a curing system. Particular embodiments are cured with a sulfur curing system that includes free sulfur and may further include, for example, one or more of accelerators, stearic acid and zinc oxide. Suitable free sulfur includes, for example, pulverized sulfur, rubber maker's sulfur, commercial sulfur, and insoluble sulfur. The amount of free sulfur included in the rubber composition is not limited and may range, for example, between 0.5 phr and 10 phr or alternatively between 0.5 phr and 5 phr or between 0.5 phr and 3 phr. Particular embodiments may include no free sulfur added in the curing system but instead include sulfur donors. Particular embodiments specifically exclude peroxide curing systems and therefore the curing system includes no peroxides.

Accelerators are used to control the time and/or temperature required for vulcanization and to improve the properties of the cured rubber composition. Particular embodiments of the present invention include one or more accelerators. One example of a suitable primary accelerator useful in the present invention is a sulfenamide. Examples of suitable sulfenamide accelerators include n-cyclohexyl-2-benzothiazole sulfenamide (CBS), N-tert-butyl-2-benzothiazole Sulfenamide (TBBS), N-Oxydiethyl-2-benzthiazolsulfenamid (MBS) and N'-dicyclohexyl-2-benzothiazolesulfenamide (DCBS). Combinations of accelerators are often useful to improve the properties of the cured rubber composition and the particular embodiments include the addition of secondary accelerators.

Other additives can be added to the rubber compositions disclosed herein as known in the art. Such additives may include, for example, some or all of the following: antidegradants, antioxidants, fatty acids, waxes, stearic acid and zinc oxide. Examples of antidegradants and antioxidants include 6PPD, 77PD, IPPD and TMQ and may be added to rubber compositions in an amount, for example, of from 0.5 phr and 5 phr. Zinc oxide may be added in an amount, for example, of between 1 phr and 6 phr or alternatively, of between 1.5 phr and 4 phr. Waxes may be added in an amount, for example, of between 1 phr and 5 phr.

It should be noted that since the rigidity and cohesiveness of the rubber compositions disclosed herein are relatively low, particular embodiments of the rubber compositions include no plasticizers, including oils and/or resins.

The rubber compositions that are embodiments of the present invention may be produced in suitable mixers, in a manner known to those having ordinary skill in the art, typically using two successive preparation phases, a first phase of thermo-mechanical working at high temperature, followed by a second phase of mechanical working at lower temperature.

The first phase of thermo-mechanical working (sometimes referred to as "non-productive" phase) is intended to mix thoroughly, by kneading, the various ingredients of the composition, with the exception of the vulcanization system. It is carried out in a suitable kneading device, such as an internal mixer or an extruder, until, under the action of the mechanical working and the high shearing imposed on the mixture, a maximum temperature generally between 120° C. and 190° C., more narrowly between 130° C. and 170° C., is reached.

After cooling of the mixture, a second phase of mechanical working is implemented at a lower temperature. Sometimes referred to as "productive" phase, this finishing phase consists of incorporating by mixing the vulcanization (or cross-linking) system (sulfur or other vulcanizing agent and accelerator(s)), in a suitable device, for example an open mill. It is performed for an appropriate time (typically between 1 and 30 minutes, for example between 2 and 10 minutes) and at a sufficiently low temperature lower than the vulcanization temperature of the mixture, so as to protect against premature vulcanization.

It should be noted that the foregoing included detailed references to particular embodiments of the present invention, which were provided by way of explanation of the invention. For example, features illustrated or described as part of one embodiment can be used with another embodiment to yield still a third embodiment. The invention is further illustrated by the following examples, which are to be regarded only as illustrations and not delimitative of the invention in any way. The properties of the compositions disclosed in the examples were evaluated as described below and these methods are suitable for measurement of the claimed properties of the present invention.

Modulus of elongation (MPa) was measured at 10% (MA10), 100% (MA100) and 300% (MA300) at a temperature of 23° C. based on ASTM Standard D412 on dumb bell test pieces. The measurements were taken in the second elongation; i.e., after an accommodation cycle. These measurements are secant moduli in MPa, based on the original cross section of the test piece.

The elongation property was measured as elongation at break (%) and the corresponding elongation stress (MPa), which is measured at 23° C. in accordance with ASTM Standard D412 on ASTM C test pieces.

The dynamic properties for the rubber compositions were measured at 23° C. on a Metravib Model VA400 ViscoAnalyzer Test System in accordance with ASTM D5992-96. The response of a sample of vulcanized material (double shear geometry with each of the two 10 mm diameter cylindrical samples being 2 mm thick) was recorded as it was being subjected to an alternating single sinusoidal shearing stress at a frequency of 10 Hz under a controlled temperature of 23° C. Scanning was effected at an amplitude of deformation of 0.05 to 90% (outward cycle) and then of 90% to 0.05% (return cycle). The value of the tangent of the loss angle tan delta was determined during the outward cycle at its maximum value, at 50% strain, and at 80% strain. The complex shear modulus G* was determined at 80% strain during the outward cycle.

EXAMPLE 1

Rubber compositions were prepared using the components shown in Table 1. The amount of each component making up the rubber compositions are provided in parts per hundred parts of rubber by weight (phr).

The carbon black was N650 having a surface area of 35 m²/g. The silica was Silene 732D a powder having a surface area of 35 m²/g from PPG. CTP is N-(cyclohexylthio) Phthalimide, a retarder for sulfur-cured elastomers.

The cure package includes sulfur, accelerator, stearic acid and zinc oxide.

The rubber formulations were prepared by mixing the components given in Table 1, except for the accelerators and sulfur, in a Banbury mixer until a temperature of between 110° C. and 170° C. was reached. The accelerators and sulfur were added in the second phase on a mill. Vulcanization was effected at 150° C. for 15 minutes. The formulations were then tested to measure their properties, the results of which are shown in Table 1.

TABLE 1

Rubber Formulations

| | Formulations | | | | | | | |
|---|---|---|---|---|---|---|---|---|
| | W1 | F1 | F2 | F3 | F4 | F5 | C1 | C2 |
| NR | 60 | 70 | 70 | 100 | 70 | 70 | 100 | |
| BR | 40 | 30 | 30 | | 30 | 30 | | 100 |
| N650 | 40 | 20 | 25 | 25 | 13 | | 40 | 40 |
| N772 | | | | | | 35 | | |
| Silene 732D | | | | | 14 | | | |
| Si69 | | | | | 1.4 | | | |
| DPG | | | | | 0.17 | | | |
| 6PPD | 1.3 | 1.3 | 1.3 | 1.3 | 1.3 | 1.3 | 1.3 | 1.3 |
| CTP | 0.3 | | | 0.4 | 0.3 | 0.3 | | |
| Zinc Oxide | 3 | 3 | 3 | 3 | 3 | 3 | 3 | 3 |
| Stearic Acid | 0.5 | 0.5 | 0.5 | 0.5 | 0.5 | 0.5 | 0.5 | 0.5 |
| CBS | 1.9 | 3.2 | 3.2 | 3.2 | 3.2 | 3.2 | 1.9 | 1.9 |
| Sulfur | 3.5 | 4.5 | 4.5 | 4.5 | 4.3 | 4.5 | 3.5 | 3.5 |
| Phys. Properties | | | | | | | | |
| MA10, MPa | 6.0 | 4.4 | 5.0 | 4.8 | 4.0 | 5.2 | 5.0 | 6.0 |
| MA100, MPa | 4.0 | 2.9 | 3.6 | 3.8 | 2.7 | 3.6 | 3.6 | 3.3 |
| TanD (80%, 23° C.) | 0.036 | 0.0162 | 0.0169 | 0.0199 | 0.0156 | 0.0240 | 0.0291 | 0.0260 |
| TanD (50%, 23° C.) | 0.034 | 0.162 | 0.164 | 0.018 | 0.0145 | | | |
| Max TanD (23° C.) | 0.048 | 0.018 | 0.019 | 0.0215 | 0.0182 | | | |
| G*80%, MPa | 1.6 | 1.3 | 1.52 | 1.36 | 1.3 | 1.40 | 1.48 | 1.82 |
| Strain at Break, % | 200 | 94 | 89 | 142 | 133 | 124 | 375 | 77 |
| Stress at Break, MPa | 13 | 4.3 | 4.8 | 9.3 | 6.2 | 1.80 | 42.1 | 2.1 |

It may be noted that the tan delta at 50% strain is lower in many of the formulations but for the formulations of interest it is the tan delta at 80% strain that is more important.

It should be noted that F1-F5 all have adequate low hysteresis at 80%. However, when looking at F5 that includes the N770 carbon black, the hysteresis is at 0.0240, significantly higher than those using the N650 carbon black. Formulations W1 and C1, with 40 phr of carbon black, provides a high hysteresis at 80%, 0.034 and 0.0291 respectively. Note that C2, having 100 phr BR provides very low strain at break, 77% even at 40 phr of carbon black.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention. Ranges that are described as being "between a and b" are inclusive of the values for "a" and "b."

What is claimed is:

1. An annular shear band defining axial, radial and circumferential directions, the annular shear band comprising:
   an annular shear layer constructed from a rubber composition;
   a plurality of discrete, annular reinforcing elements positioned along a plurality of axially-oriented rows throughout the annular shear layer, the reinforcing elements separated from one another by a predetermined distance, each reinforcing element having a centerpoint, wherein the reinforcing elements are interlaced along the axial or radial direction of the shear band such that the centerpoints of reinforcing elements of adjacent, axially-oriented rows are arranged to form a rhombus having non-orthogonal angles between sides of the rhombus, wherein the rubber composition is based upon a cross-linkable rubber composition, the cross-linkable rubber composition comprising, in parts by weight per 100 parts by weight of rubber (phr):
   between 50 phr and 100 phr of a natural rubber;
   between 0 phr and 50 phr of a second rubber component selected from the group consisting of polybutadiene rubber, a copolymer of polybutadiene and styrene wherein the copolymer has no more than 5 mol % styrene and combinations thereof;
   between 15 phr and 40 phr of a reinforcing filler that comprises at least 5 phr but no more than 35 phr of a total amount of a carbon black, the total amount of the carbon black limited to a first portion having a target surface area of between 25 m²/g and 39 m²/g and between 0 phr and 5 phr of a second portion having its surface area of other than between 25 m²/g and 39 m²/g; and
   a sulfur cure system.

2. The annular shear band of claim 1, wherein the reinforcing filler is between 20 phr and 40 phr.

3. The annular shear band of claim 1, wherein the reinforcing filler includes less than 30 phr of the total amount of the carbon black.

4. The annular shear band of claim 1, wherein the target surface area of the first portion of the carbon black is between 32 m²/g and 39 m²/g.

5. The annular shear band of claim 1, wherein the rubber composition includes 0 phr of the second potion of carbon black.

6. The annular shear band of claim 1, wherein the rubber composition includes 100 phr of natural rubber.

7. The annular shear band of claim 1, wherein the reinforcing filler is selected from the group consisting of the carbon black and a combination of the carbon black and a silica.

8. The annular shear band of claim 7, wherein a surface area of the silica is between 25 m²/g and 39 m²/g.

9. The annular shear band of claim 8, wherein the surface area of the silica is between 29 m²/g and 39 m²/g.

10. The annular shear band of claim 8, wherein the reinforcing filler includes the silica, the cross-linkable rubber composition further comprises up to 20 phr of a third rubber component that is a functionalized styrene-butadiene copolymer having between 1 mol % and 35 mol % styrene, wherein the styrene-butadiene copolymer is functionalized with a moiety capable of bonding with the silica reinforcing filler.

11. The annular shear band of claim 7, wherein the reinforcing filler is the carbon black.

12. The annular shear band of claim 11, wherein the reinforcing filler comprises no more than 25 phr of the carbon black.

13. The annular shear band of any of the preceding claims, wherein the rubber composition has a tan delta measured at 23° C. and at 80% strain of between 0.013 and 0.025, a shear modulus G* measured at 23° C. and at 80% strain of at least 1.30 MPa, and a strain at break of greater than 80%.

14. The annular shear band of claim 13, wherein the tan delta is between 0.013 and 0.022.

15. The annular shear band of claim 14, wherein the shear modulus G* is between 1.30 MPa and 1.80 MPa.

16. The annular shear band of claim 1, wherein the reinforcing elements are interlaced along the axial direction, said reinforcing elements each have a nominal diameter $\Phi$, wherein non-adjacent, axially-oriented rows of said reinforcing elements are separated from each other by a predetermined distance, $w_s$, of about $\Phi/4$, and wherein adjacent, axially-oriented rows of said reinforcing elements are separated from each other by the predetermined distance, $w_s$, of about $\Phi/4$.

17. The annular shear band of claim 1, wherein the reinforcing elements are interlaced along the radial direction, said reinforcing elements each have a nominal diameter $\Phi$, wherein adjacent, axially-oriented rows of said reinforcing elements are separated from each other by a predetermined distance, $w_s$, of about $\Phi/4$, and wherein adjacent reinforcing elements along an axially-oriented row of said reinforcing elements are separated from each other by the predetermined distance, $w_s$, of about $\Phi/4$.

18. The annular shear band of claim 1, the shear band having a nominal diameter ND, and wherein said reinforcing elements each have a nominal diameter $\Phi$ that is in the range of about ND/200 to about ND/1000.

19. A non-pneumatic wheel comprising the annular shear band of claim 1.

* * * * *